United States Patent [19]

Basteck

[11] Patent Number: 5,533,847
[45] Date of Patent: Jul. 9, 1996

[54] ALIGNMENT ADAPTER

[76] Inventor: Andreas Basteck, Am Oberen Scholberg 6, 71686 Remseck, Germany

[21] Appl. No.: 376,500

[22] Filed: Jan. 23, 1995

[30] Foreign Application Priority Data

Feb. 16, 1994 [DE] Germany ............................ 44 04 725.8

[51] Int. Cl.⁶ .......................... B23C 5/16; B23B 29/034; B23B 31/36
[52] U.S. Cl. ............................ 409/234; 279/6; 408/150; 408/181
[58] Field of Search ....................... 279/6, 133; 408/150, 408/153, 156, 181; 409/234; 82/170

[56] References Cited

U.S. PATENT DOCUMENTS 2,276,945  3/1942  Ehrich ........................................ 279/6
2,751,614  6/1956  Bourguignon .............................. 279/6
4,776,734  10/1988  Buettiker et al. ........................... 279/6

FOREIGN PATENT DOCUMENTS

0418041A2  3/1991  European Pat. Off. ............... 408/156

*Primary Examiner*—Steven C. Bishop

[57] ABSTRACT

In known tool holders only a single screw is used to compensate for axiality faults which exist. It is true that this is a simple construction, but it is not adequate for sensitive compensation of axiality faults requiring attention, particularly in fine drilling. According to the invention this is achieved in the case of the invention by using a tangential tension screw 73 to move towards one another the two sectors 78, 79 of a compensator ring 13, so that the adapter 14 can be sensitively moved into a position in which the geometrical longitudinal axis 17 of the tool 93 becomes coaxial to the spindle axis.

18 Claims, 7 Drawing Sheets

ALIGNMENT ADAPTER

BACKGROUND OF THE INVENTION

1. Field of the Invention

The invention relates to an apparatus for compensating for axiality faults in tool holders.

2. Relevant Prior Art

An apparatus of this kind is described in U.S. Pat. No. 4,776,734. According to column 1, lines 30 to 34, the known apparatus has a simple construction which permits rapid and accurate alignment of the axis of a tool, and it should at the same time be simple to handle. Provision is essentially made to provide a single adjusting screw which, in accordance with sheet 37.6 of the official documents, lies directly against the peripheral surface of the one part of the holder, specifically without a pressure member between the screw and the peripheral surface. The construction may indeed be simple, but this is achieved at the cost of accuracy of adjustability, because axiality-faults are very frequently in the range below 10 micrometers.

SUMMARY OF THE INVENTION

The invention starts from the realization that an adjustment adapter has to be manufactured and paid for only once, but that errors which may be caused by it occur in every workpiece produced, so that it is better to select a more expensive construction.

According to the invention this object of more effectively eliminating axial faults is achieved with an apparatus for compensating for axial faults in tool holders having a shank part, an adapter device, and a compensating ring. The shank part has a circular cylindrical external surface coaxial to reference surfaces of the shank part, and a first radial surface. The adapter device has a tool mounting for a tool and a second radial surface lying opposite the first radial surface of the shank part. The adapter device also has a circular cylindrical external surface coaxial to the tool and axially parallel screws arranged to pull the adapter device against the shank part. The compensator ring has a first circular cylindrical coaxial internal surface seated with play on the external cylindrical surface of the shank part and rotatable thereon. The compensator ring also has a second circular cylindrical internal surface lying with play on the circular cylindrical external surface of the adapter device, a screw device by which coaxiality of the adapter device relative to the shank part can be at least partially influenced and a securing device that secures the compensator ring against axial movement relative to the shank part. The compensator ring further has a first, non-continuous radial slot that forms first and second ring portions having the first and second circular cylindrical internal surfaces of the compensator ring respectively thereon and two ring segments. One ring segment has a second radial slot that is bridged over by a screw device that lies at least substantially in a radial plane.

The invention can be used to advantage in fine drilling and fine reaming, such as are required for example in the production of valve guides, and in addition for stepped bores in this field and also with very long reaming tools. The invention avoids making the bore with a different quality at the entry end from that at the outlet end. The invention also provides a substantially quieter entry process. The service life of the cutting edges of the cutting tools is lengthened, and this is also true of the wearing and guide strips. In manufacture there is now obtained, for example for a valve stem which in itself can easily be made extremely circular or for some other circular cylindrical object, an equally circular bore. It is therefore not necessary to accept a practically ideally circular cylindrical stem lying in an oval or egg-shaped hole cross-section.

DESCRIPTION OF THE DRAWINGS

The invention will now be explained with the aid of preferred exemplary embodiments. In the drawing.

DETAILED DESCRIPTION OF PREFERRED EMBODIMENTS

Figure 1:
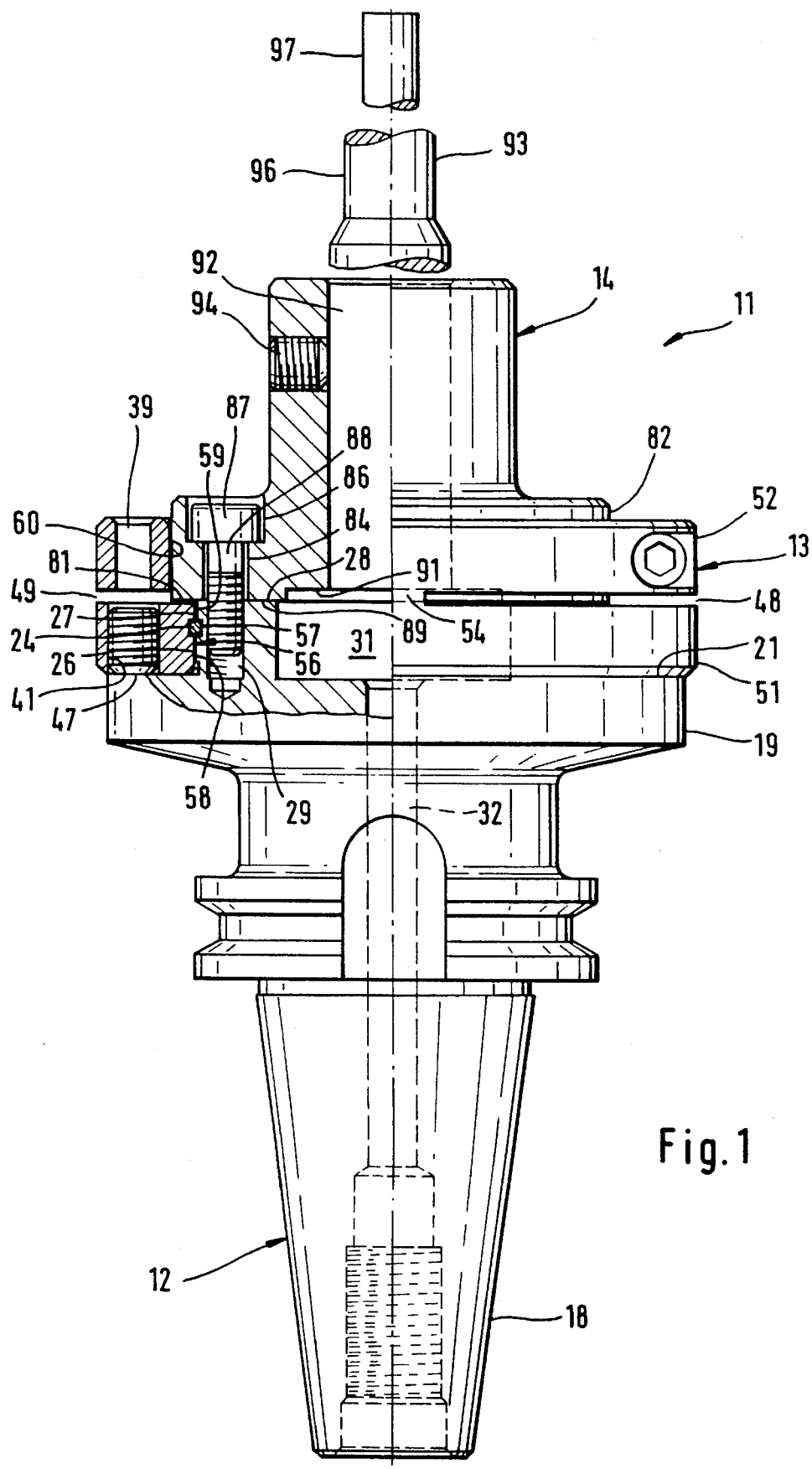
FIG. 1 shows a side view of the apparatus, partly in section, as an assembly drawing.
Figure 2:
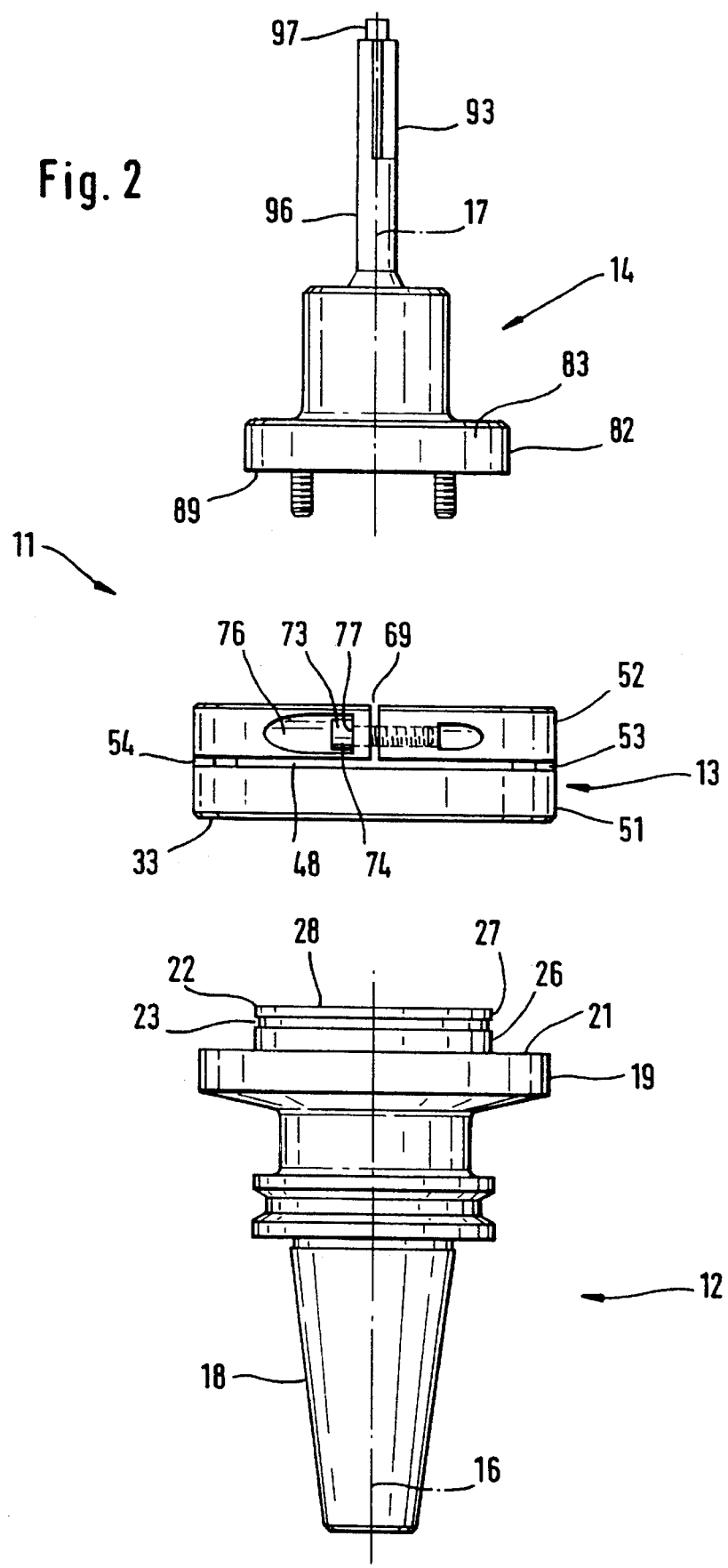
FIG. 2 shows a side view as in FIG. 1, but in exploded form and with the compensator ring turned round.
Figure 3:
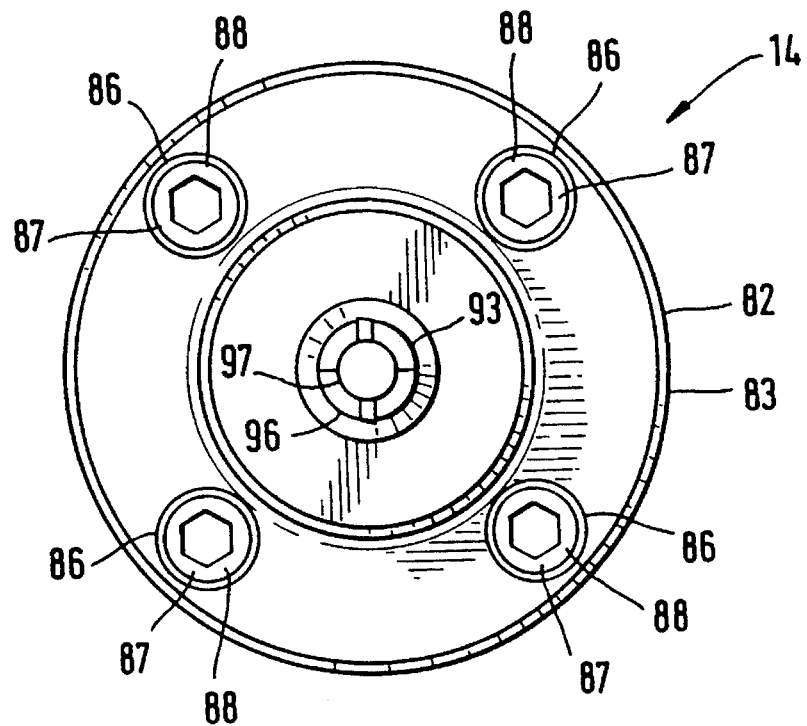
FIG. 3 shows a plan view of the uppermost part of FIG. 2.
Figure 4:
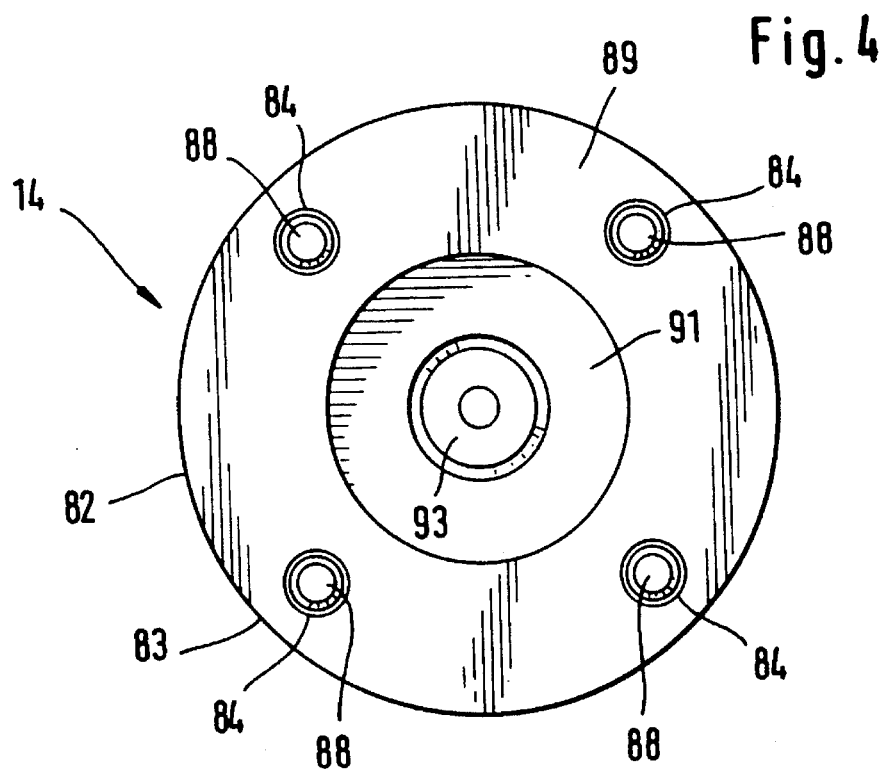
FIG. 4 shows a bottom view corresponding to FIG. 3.
Figure 5:
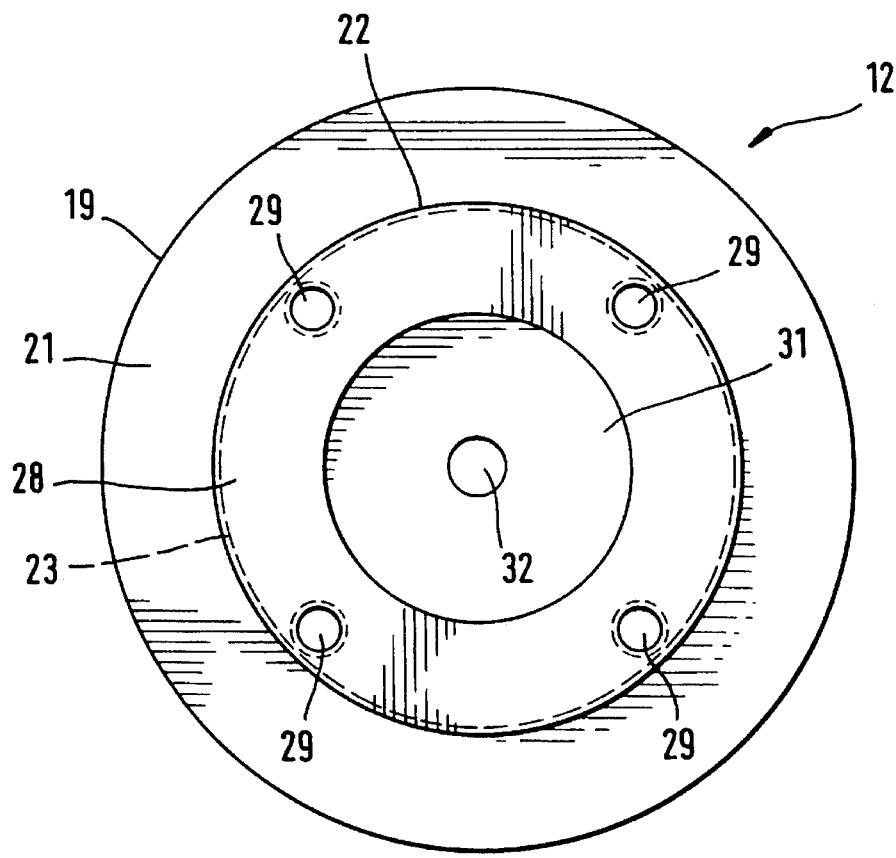
FIG. 5 shows a plan view of the lowermost part of FIG. 2.
Figure 8:
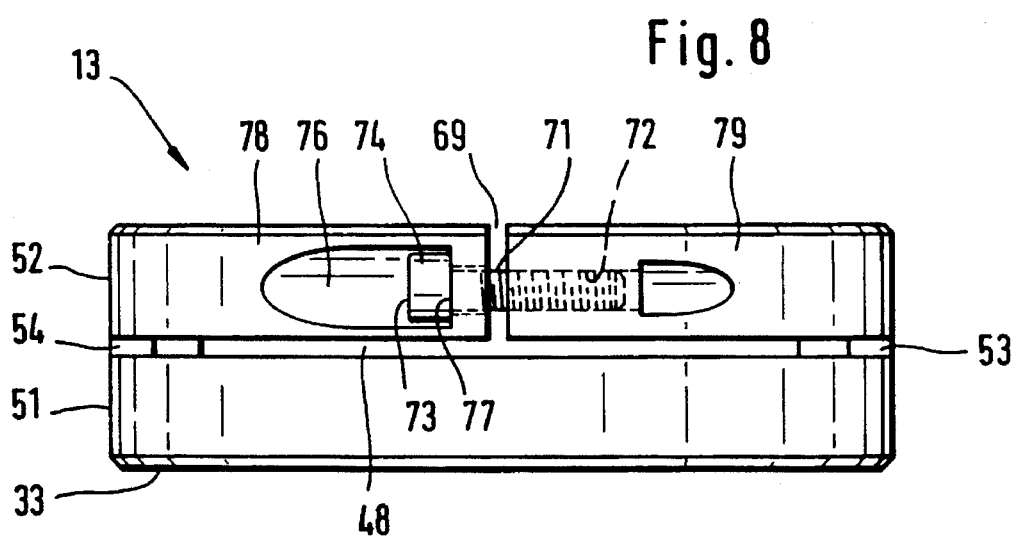
FIG. 8 shows a view in the direction of the arrow 8 in FIG. 6.

A tool holder 11 comprises by and large a shank part 12, a compensator ring 13 and an adapter 14. The shank part 12 has a geometrical longitudinal axis 16 which is or is not in line with the geometrical longitudinal axis (not shown) of a spindle (not shown). If it is in line, then at least this part neither has an axial fault nor wobbles. However, if these two geometrical longitudinal axes are not in line, the invention can eliminate this fault also. More frequent is the case in which the geometrical longitudinal axes 16 and 17 are not in line, and this fault also can be put right by means of the invention.

The shank part 12 has a customary cone 18. In the upward direction it widens into a plate-like flange 19, whose upper face has a ground annular surface 21 which is at right angles to the geometrical longitudinal axis 16. From said annular surface a coaxial projection 22 extends upwards and, at a short distance from the annular surface 21, has a coaxial circumferential groove 23. An O-ring 24 lies in said circumferential groove 23 but projects outwards beyond the latter to the extent of about half of its cross-sectional circumference. The circumferential groove 23 divides the circumference of the projection 22 into a bottom cylindrical surface 26 and a top cylindrical surface 27. The two cylindrical surfaces are ground and lie coaxially to the geometrical longitudinal axis 16. The bottom cylindrical surface 26 has a G6/H7 fit relative to a cylindrical bore which lies opposite it and will be explained later on. The top cylindrical surface 27 has, for reasons which will be explained later on, a smaller circumference than the bottom cylindrical surface 26. In respect of the accuracy data given in this connection it should be borne in mind that faults of axial parallelism or wobbling are in the range below 10 micrometers, and in this connection accuracy explanations should be observed.

Figure 7:
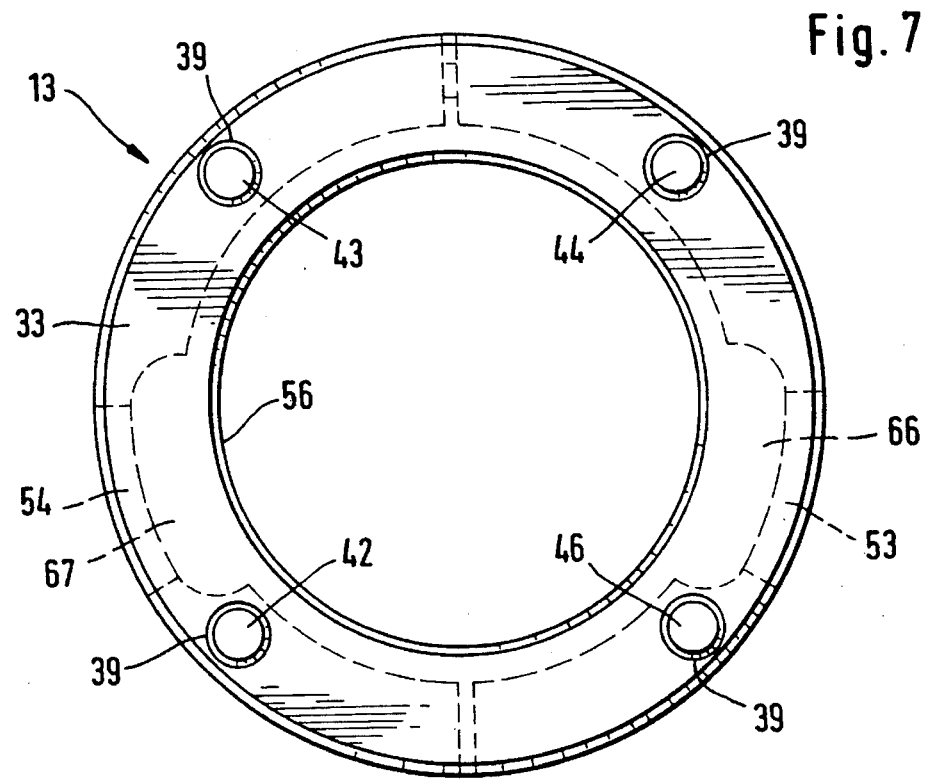
FIG. 7 shows a bottom view corresponding to FIG. 6.
Figure 10:
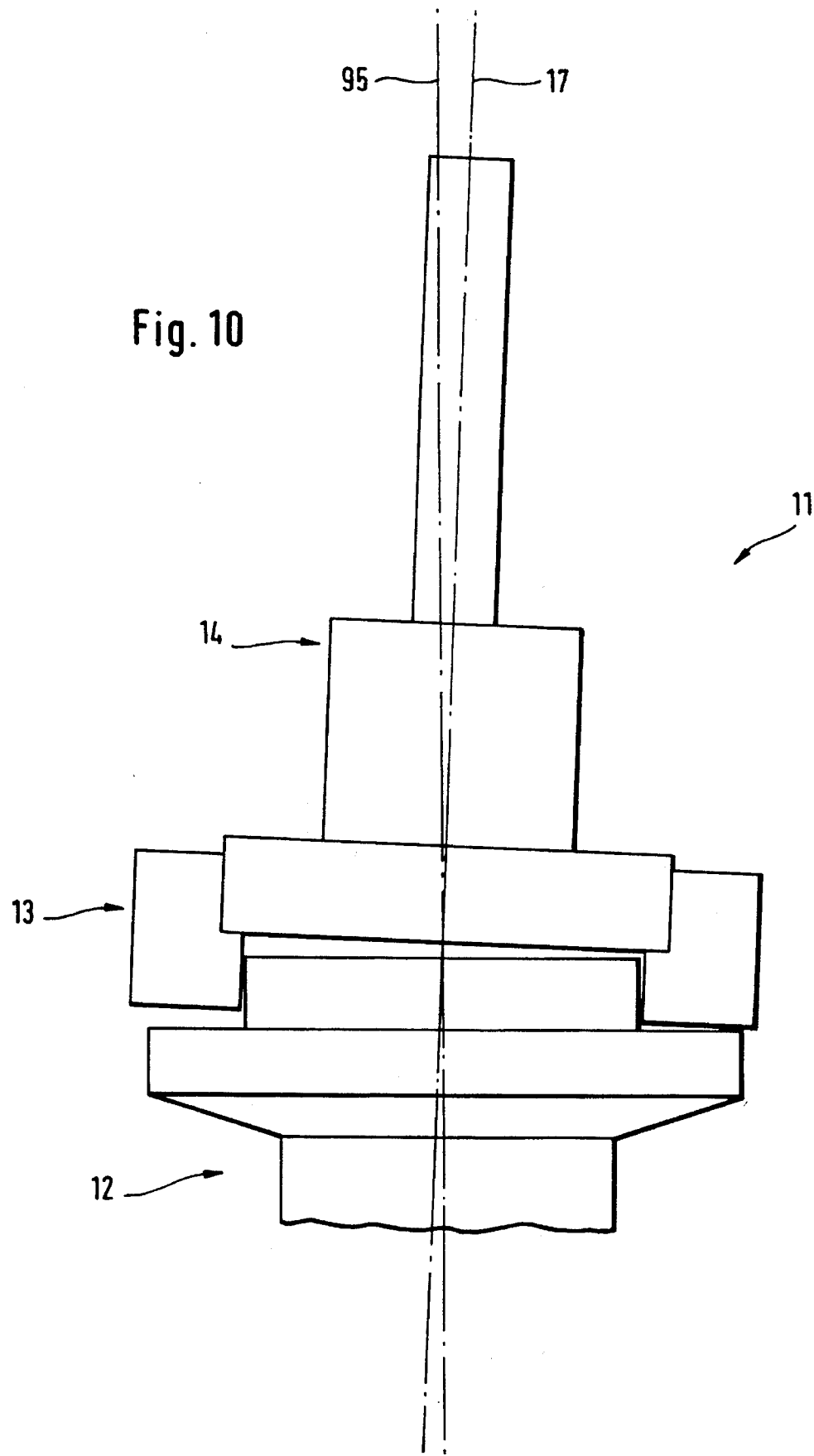
FIG. 10 shows a schematic representation, not drawn to scale, of the procedure for the elimination of wobble faults.

On its upper face the projection 22 has a ground annular surface 28, which lies at right angles to the geometrical longitudinal axis 16. Axially parallel threaded holes in the form of blind holes 29, distributed at uniform angles, are provided in the annular surface 28. The circular region 31 enclosed by the annular surface 28 is offset axially downwards, so that it dependably does not extend above the annular surface 28. A coolant bore 32 is provided coaxially. On its lower face the compensator ring 13 has an annular surface 33, the size of which corresponds approximately to that of the annular surface 21. The annular surface 33 lies outside the annular surface 28. Four through bores 39, distributed at regular angles, are drilled through the compensator ring 13, which bores, in accordance with FIG. 7, lie in the outermost edge region of the annular surface 33 and in the assembled state are at least to some extent parallel to the geometrical longitudinal axes 16 and 17. In their upper region the through bores 34, 36, 37, 38 are provided with smooth walls, while the respective bottom regions have an internal screw thread 41. The through bores 34, 36, 37, 38 are divided into smooth walls and internal screw threads by slots, which will be explained shortly. Pressure screws 42, 43, 44, 46, the bottom end face 47 of which is supported on the annular surface 21 when one or more of the pressure screws 42, 43, 44, 46 is or are tightened, and which can tip the compensator ring 13 in the manner shown very exaggeratedly in FIG. 10, are inserted into the internal screw threads.

Figure 6:
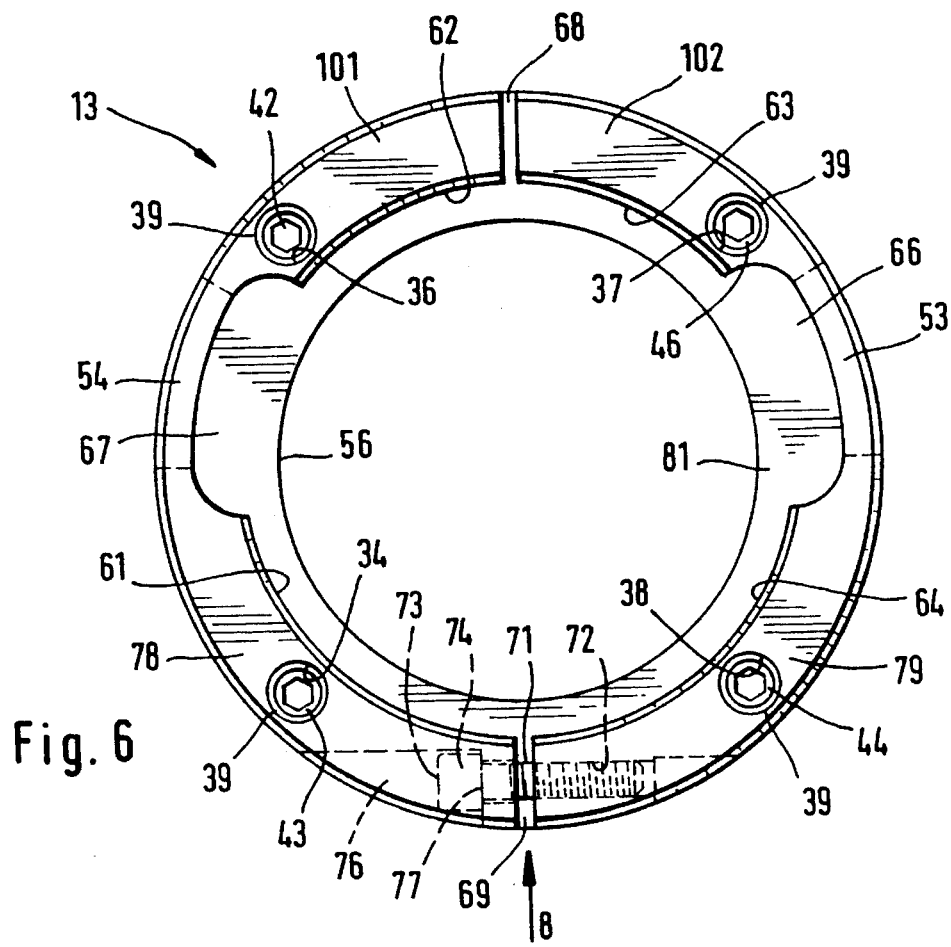
FIG. 6 shows a plan view of the compensator ring.

The compensator ring 13 is divided in height by two narrow slots 48, 49 into a bottom deck 51 and a top deck 52. The top deck 52 and the bottom deck 51 are connected to one another by bridges 53, 54, which, as shown in FIG. 6, are situated approximately at half past two o'clock and half past nine o'clock. The bottom deck 51 is a solid, continuous ring which can take bending loads.

On its circular cylindrical, ground inner wall 56, which is at least substantially concentric to the geometrical longitudinal axes 16, 17, the bottom deck 51 has an internal groove 57, which in the assembled state lies substantially at the same height as the peripheral groove 23 and in which the remainder of the cross-section of the O-ring 24 lies. The internal groove 57 divides the inner wall 56 into a bottom internal cylinder surface 58 and a top internal cylinder surface 59, so that the former lies opposite the bottom cylinder surface 26 and the latter lies opposite the top cylinder surface 27. Cylindrical surfaces 26 and 58 thus have the fit H7/G6 relative to one another, specifically for the reason which is clear above all from FIG. 10: if both the bottom cylinder surface 26 and the bottom internal cylinder surface 58, as well as the top cylinder surface 27 and the top internal cylinder surface 59, had such close tolerances that on the one hand very accurate axial displacement is certainly possible, but that on the other hand practically no radial play exists, the inclination which is shown in FIG. 10, and which in reality is far less than one arc minute, could not be achieved at all, because such pin/bore tilting would be quite impossible. In comparison with cylindrical surfaces 26 and 58 the top cylinder surface 27 and the top internal cylinder surface 59 have no or practically no guiding function.

The pressure screws 42, 43, 44, 46 are not higher than the bottom deck 51, which is equal in height to the top deck 52, so that the slots 48, 49 are situated approximately at half height. The top internal cylinder surface 60 comprises four cylinder segments 61, 62, 63, 64, which, as shown in FIG. 6, lie on a larger diameter than cylindrical surfaces 26 and 58. In the angular region of the bridges 53, 54 are provided indentations 66, 67 which considerably weaken the cross-section of the top deck 52 and, as shown in FIG. 6, have the shape of semi-ovals. Two radial slots 68, 69, situated in FIG. 6 at twelve o'clock and at six o'clock, further divide the top deck down to the slots 48, 49. The shank 71 of a tension screw extends through the radial slot 69, its screw thread, as shown in FIG. 6, being screwed to the right into an internal screw thread 72 of a tangential bore lying at right angles to the radial slot 69. The other end of the tension screw has a head 74 which projects to the left and which is supported in a recess 76 provided on the left of the radial slot 69. In the recess 76 the head 74 can be supported on a support surface 77 extending substantially radially. If the tension screw 73 is tightened, the radial slot 69 becomes narrower, its width decreasing the more the tension screw 73 is tightened. The sectors 78, 79 pivot towards one another, approximately around the bridges 53, 54, and these parts move to a greater or lesser extent in the direction of the radial slot 68. Since the O-ring 24 bridges over the circumferential groove 23 and the internal groove 57, the compensator ring 13 is held on the projection 22, provided that its catch action is not exceeded.

Inward of the cylinder segments 61, 62, 63, 64, in the direction of viewing of FIG. 6, the bottom deck 51 is provided with a radial, ground annular surface 81, which lies at least substantially at right angles to the geometrical longitudinal axis 16. The compensator ring can be turned about the projection 22 with imperceptible radial play.

The adapter 14 has an outwardly projecting circumferential flange 82 coaxial to the geometrical longitudinal axis 17. Its circular cylindrical external circumferential surface 83 is accurately ground and fits with comparatively considerable play between the cylinder segments 61, 62, 63, 64. The external circumferential surface 83 is coaxial to the geometrical longitudinal axis 17. In the circumferential flange 82 are provided axially parallel through bores 84, which at their top end have a screw head seat 86 in which sits a screw head 87 of a tension screw whose shank passes through the through bores 84. The four through bores are congruent with the threaded holes 29. Into the latter are screwed the external screw threads of the tension screws 88. At the bottom the through bores 84 lead into a circular annular surface 89, which is ground and lies at right angles to the geometrical longitudinal axis 17. It lies on the annular surface 28, against which it can be pulled by the tension screws 88. On the other hand, it does not lie or lies only insignificantly on the annular surface 81. Inside the circular annular surface 89 is provided an upwardly set-back annular depression 91, which is not in contact with any surface lying beneath it.

Centrally in the adapter 14 is provided a coaxial through bore 92, into which is inserted the shank of a tool 93, secured by a transverse screw 94. The tool 96 has a bottom circular cylindrical measuring surface 96 and a top circular cylindrical measuring surface 97, both of which are ground and lie exactly parallel to the geometrical longitudinal axis of the tool 93.

Figure 9:
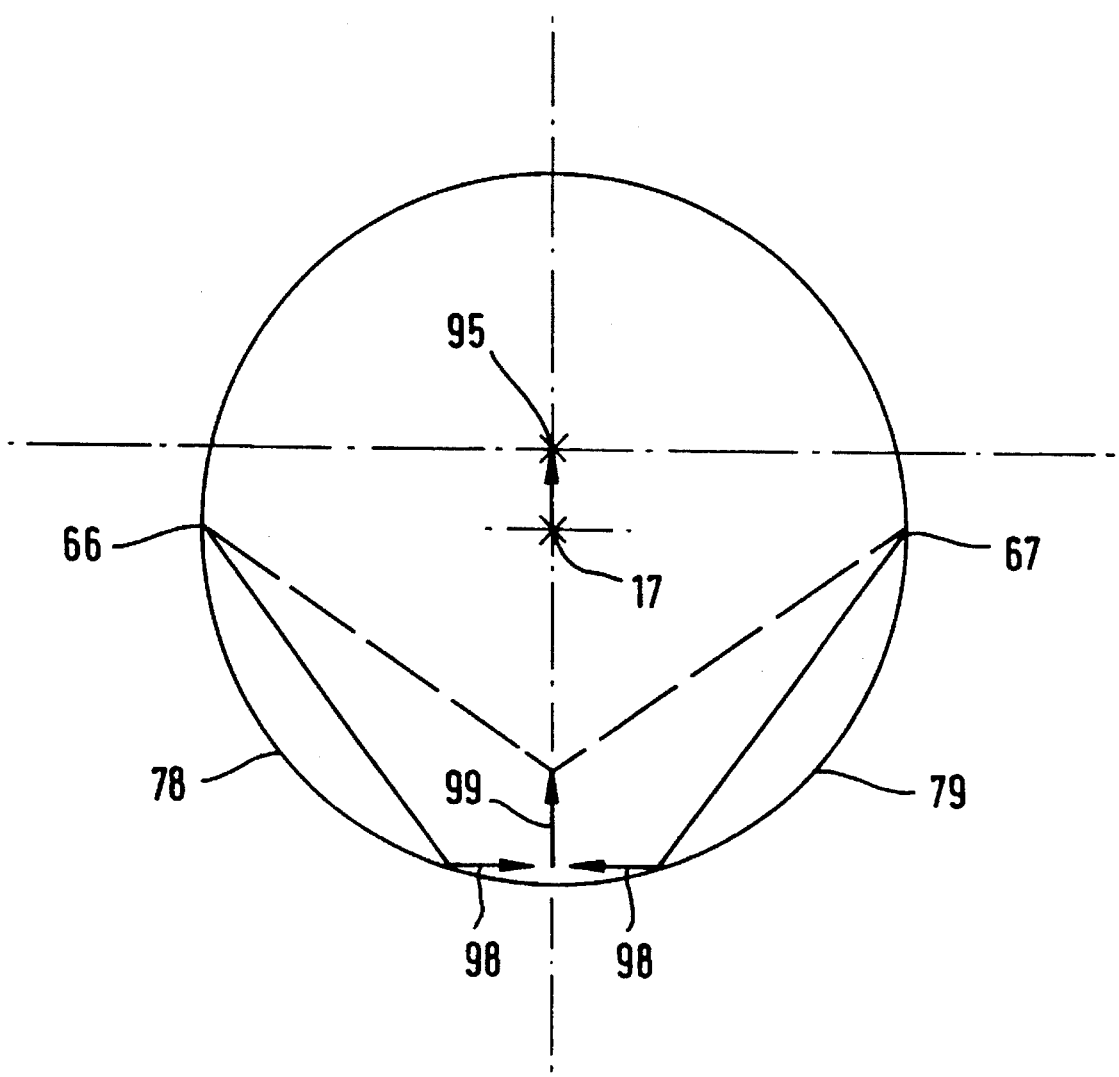
FIG. 9 shows a schematic representation, not drawn to scale, to explain the action in the compensation of axiality faults.

In most cases the geometrical longitudinal axis 17 is not parallel to the geometrical longitudinal axis 16, and the geometrical longitudinal axis 16 may also not coincide with the geometrical axis of the machine tool spindle. A description will now be given of the procedure adopted when the geometrical longitudinal axis 17 is not parallel to the geometrical longitudinal axis of the spindle. The explanation is given with the aid of FIG. 9, which for the sake of clarity is drawn with great exaggeration. The machine tool has a geometrical spindle axis 95, the extension of which is to form the geometrical longitudinal axis 17. At first the latter is at the distance therefrom which can be seen in FIG. 9. The tension screws 88 are now tightened so that the circular annular surface 89 is firmly pressed against the annular surface 28. The tension of the tension screws 88 has however not yet reached its definitive tensile stress. On the contrary, the tensile stress is lower by an amount which enables the annular surface 28 to be displaced, relative to the circular annular surface 89, in the range from 0–200μ. The tool holder 11 is then turned and a measuring sensor is applied to the measuring surface 96. It can now be seen on which side the geometrical longitudinal axis 17 has the greatest divergence. The compensator ring is then turned in that direction so that the radial slot 69 points in said direction. Only the compensator ring 13, and nothing else, is turned. The tension screw 73 is then tightened. The radial slot 69 thus becomes narrower and the sectors 78 and 79, here represented by two circular segments, move in the directions of the arrows 98 both towards one another and inwards in the direction of the arrow 99. The cylinder segments 61, 64 thus press the external circumferential surface 83, embraced over a large area, a distance along the length of the arrow 99, so that the geometrical longitudinal axis 17 comes into line with the geometrical longitudinal axis 95 of the machine tool spindle. Hold-up support is here provided by the sectors 101, 102 on both sides of the radial slot 68. A slipstick effect, whereby nothing at all happens at first when the tension screw 73 is tightened, and then suddenly the circular annular surface 89 slips too far, is thereby avoided. The broken and solid lines in FIG. 9 represent approximations of the actually circular sectors 78 and 79.

In addition to the lack of coaxiality just described, angularity faults may also occur. The tool 93 then wobbles and its geometrical longitudinal axis 17 shifts on a circular cone. The wobble amplitude is greatest in the region of the measuring surface 97. In FIG. 10 the geometrical longitudinal axis 95 of the machine tool spindle can be seen. Before elimination of wobble is commenced, the tension screws 88 should be fully tightened and the operations described with reference to FIG. 9 should be completed. Contrary to FIG. 10, which should be regarded as merely schematic, the circular annular surface 89 and the annular surface 28 now lie under full pressure against one another and also could no longer be displaced relative to one another by tightening the tension screw 73.

The tool holder 11 is now again turned about its axis by turning the machine tool spindle. A measuring sensor is then once again applied against the measuring surface 97. A maximum divergence then occurs towards one side, towards the right in FIG. 10. The compensator ring 13 is now turned so that one of its pressure screws 42, 43, 44, 46 is situated there, this screw is screwed into the internal screw thread 41 so that its bottom end face 47 stands on the annular surface 21, and this pressure screw 42 or 43 or 44 or 46 is then screwed in until the geometrical longitudinal axis 95 is in line with the geometrical longitudinal axis 17. Since the O-ring 24 is elastic and in any case only μ distances are involved, the O-ring 24 participates in this movement. This angular movement is obtained not so much, for example, by bending the periphery of the flange 82, but rather the tension screws 88 are extended at the point where the geometrical longitudinal axis 17 has its greatest inclination.

It is naturally possible, although this is not necessary, first to eliminate partially the fault of lack of coaxiality and then partially the angularity fault (wobble), and then to proceed repetitively until both faults have been eliminated.

Instead of the cone 18, other mountings can also be used.

Instead of the G6/H7 fit, a different fit, such as H8/J7, can also be used (tolerance zone displacement). A clearance fit, that is to say not a transition fit and definitely not a press fit, is provided.

The recesses 66, 67 may also have a different shape, such as for example a semicircular shape.

For reasons of economy the compensator ring 13 can be manufactured in a simplified manner: the radial slot 68 is not cut, so that the sectors 101, 102 are solidly connected. In addition, the slot 49 may also not be machined, so that 101 and 102 are solidly connected to the bottom deck 51.

I claim:

1. Apparatus for compensating for axiality faults in tool holders, comprising:

a shank part having a circular cylindrical external surface coaxial to reference surfaces of said shank part, and a first radial surface, an adapter device having a tool mounting for a tool, a second radial surface lying opposite said first radial surface of said shank part, a circular cylindrical external surface coaxial to said tool, and axially parallel screws arranged to pull said adapter device against said shank part, and a compensator ring having a first circular cylindrical coaxial internal surface seated with play on said circular cylindrical external surface of said shank part and rotatable thereon, a second circular cylindrical internal surface lying with play on said circular cylindrical external surface of said adapter device, a screw device by which coaxiality of said adapter device relative to said shank part can be at least partly influenced, and a securing device that secures said compensator ring against axial movement relative to said shank part, said compensator ring also having a first, non-continuous radial slot that forms first and second ring portions having said first and second circular cylindrical coaxial internal surfaces respectively thereon and two ring segments, one ring segment having a second radial slot that is bridged over by a screw device that lies at least substantially in a radial plane.

2. Apparatus according to claim 1, wherein said first, non-continuous radial slot divides said compensator ring in respect of height in a ratio of 1:1±70%.

3. Apparatus according to claim 1, wherein said one ring segment is provided to a length of 250 degrees to 80 degrees.

4. Apparatus according to claim 1, wherein said second radial slot divides said two ring segments in a ratio of 1:1±80%.

5. Apparatus according to claim 1, wherein said compensator ring is in one piece.

6. Apparatus according to claim 4, wherein each of said two ring segments is provided in its root region with a weakening forming a predetermined bending point.

7. Apparatus according to claim 6, wherein said weakening is situated on said one ring segment on its inner sides.

8. Apparatus according to claim 4, wherein said two ring segments lie opposite each other and are at least similar.

9. Apparatus according to claim 8, wherein a second of said two ring segments comprises a resilient hold-up support for said one ring segment.

10. Apparatus according to claim 1, wherein said screw device extends at right angles to said second radial slot.

11. Apparatus according to claim 1, wherein said second radial slot is provided with a through-bore on both of its sides, one of said bores has an internal screw thread and the other of said bores leads into a head seat.

12. Apparatus according to claim 1, further comprising at least one pressure screw arranged to compensate for wobble fault, extending at least substantially axially parallel, acting on one side on said compensator ring and on another side on said shank part, by means of which said second radial surface on said adapter can be brought slightly out of parallelism relative to said first radial surface on said shank part.

13. Apparatus according to claim 12, wherein said shank part has, opposite said compensator ring, a substantially radial annular flange on which said pressure screw acts.

14. Apparatus according to claim 13, wherein said annular flange has a radial surface.

15. Apparatus according to claim 12, wherein said compensator ring has at least one axially parallel internal threaded bore.

16. Apparatus according to claim 13, wherein said pressure screw has an end-face arranged to be pressed onto said shank part.

17. Apparatus according to claim 16, wherein said pressure screw is a grub screw that is shorter than said internal threaded bore.

18. Apparatus according to claim 1, wherein said securing device comprises an external circumferential groove in said shank part and an internal circumferential groove in said compensator ring facing said external circumferential groove in said shank part, further comprising an O-ring disposed as a bridge in said external and internal circumferential grooves.

* * * * *